Nov. 19, 1929.  H. J. MURRAY  1,736,289

DUAL CONTROL GAS CUT-OFF

Filed Nov. 30, 1926

INVENTOR
HOWARD J. MURRAY
BY
Warren S. Orton
ATTORNEY

Patented Nov. 19, 1929

1,736,289

UNITED STATES PATENT OFFICE

HOWARD J. MURRAY, OF BROOKLYN, NEW YORK, ASSIGNOR TO HENRY SIEBEN, OF HADLEY, NEW YORK

DUAL-CONTROL GAS CUT-OFF

Application filed November 30, 1926. Serial No. 151,819.

The invention relates in general to shut-off valves, particularly of the type of valves used for shutting off a gas or liquid flow to a building, and the invention relates to that type of such valves which are either manually actuated or automatically actuated by a raise of temperature in the vicinity.

The present disclosure constitutes in part another embodiment of my invention entitled "Gas cut-off", Serial No. 151,818 filed under even date.

The primary object of the invention is to provide a simplified structure of valve which can be closed at will or automatically by valve control mechanisms which are independent of each other.

While it is required of such structures that they be designed to work automatically in case of a fire or excessive heat in the vicinity of the valve, it is seldom that the construction is called upon to function at all, and even then the closing of the valve is in most cases done by the actuation of the manual control when testing the device. It is further required in all cases that the valve when moved onto its seat engage the same firmly and preferably locked in closed position under the force of a powerfully acting spring. It is common in such structures to provide a spring for this purpose but the springs heretofore used for this purpose have been under tension at all times and as the device is permitted to remain inoperative for years any such spring is bound to lose its tension when distorted for such a long period of time.

Accordingly another object of the invention is to provide a simple form of shut-off valve of the type outlined and which when once set will not have its automatically closing features disturbed even though the valve may be repeatedly closed by the manual actuation.

Another object of the invention is to provide in connection with the manual actuated valve closing mechanism a powerful spring which is not normally under tension, or rather which is not under any material tension or distortion, until the valve closing mechanism is manually actuated. In the form of the invention disclosed advantage is taken of the nervous energy of the operator in the usual jerk on the controlling pull rod so as to place the spring under tension and the parts are so arranged that the tensioned spring will react on the valve to maintain the same in firm pressing engagement with its seat.

Another object of the invention is to provide a simple structure for automatically locking the valve in its closed position when moved into such closed position.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

Figure 1:
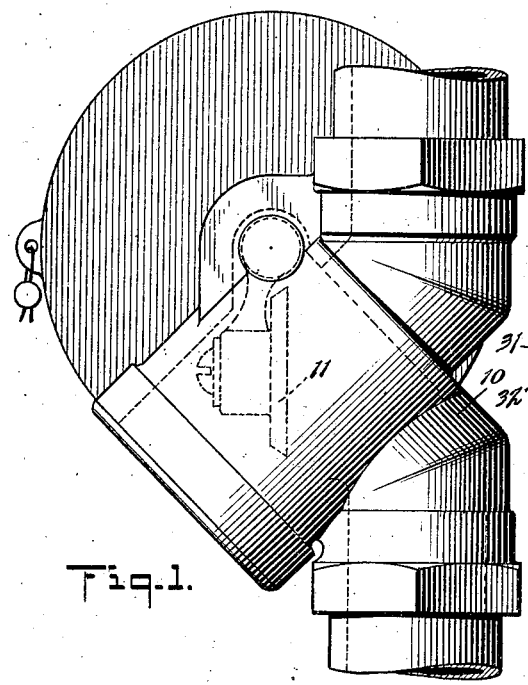
Fig. 1 is a view in side elevation of a cut-off valve structure equipped with a preferred embodiment of the invention and showing the valve in open position in dotted outline.
Figure 2:
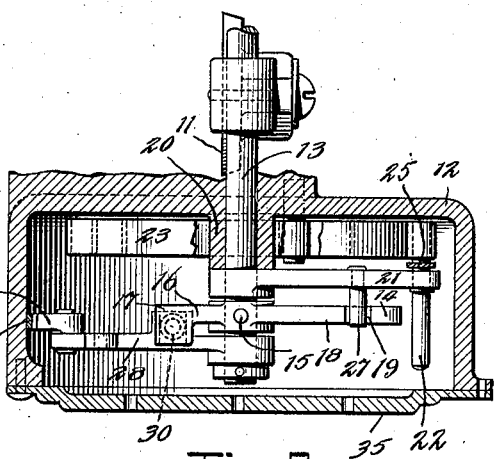
Fig. 2 is a horizontal sectional view taken axially through the mechanism containing casing shown in rear elevation in Fig. 1.

In the drawing there is shown a casting including a valve casing 10 in which is rotatably mounted a valve 11 and which casting includes an integrally formed mechanism containing casing 12 into which the stem 13 of the valve intrudes.

The portion of the valve stem intruded into the casing 12 has an operating member comprising the valve arms 14 and 16, secured to the stem by a pin 15, the arm 16 being shorter than the arm 14, and provided with a downwardly facing spring seat 17. The other arm 18 is relatively long and is provided adjacent its outer end with a pin seat 19. Loosely mounted on the stem 13 and between a hub 20 forming part of the casting 10 and the operating member 14, 16 is a relatively long automatically actuating arm 21. The free end of the arm 21 is provided with a long pin 22 to the rear end of which is secured one end of a flat coiled spring 23 the opposite or inner end of which is secured to pin 24 projecting from the casting. The spring when the arm is released acts to swing the arm 21 clockwise to close the valve as hereinafter described. The arm 21 is normally held in inoperative position by means of a fusible link 25 one end of which is secured to the pin 22 and the other end of which is secured to a screw 26 threaded into the casting. The arm 21 is provided with a laterally extending pin 27 normally resting in the pin seat 19. It is appreciated that the melting of the fuse 25 releases its holding effect on the arm 21 and permits the spring 23 to act through the arm 21, pin 27 and valve arm 18, to swing the valve from the open position as shown in Fig. 1 into engagement with its seat thus intercepting the flow through the valve casing 10. The spring is designed so that it will not only close the valve but will also maintain the valve secure on its seat.

Figure 3:
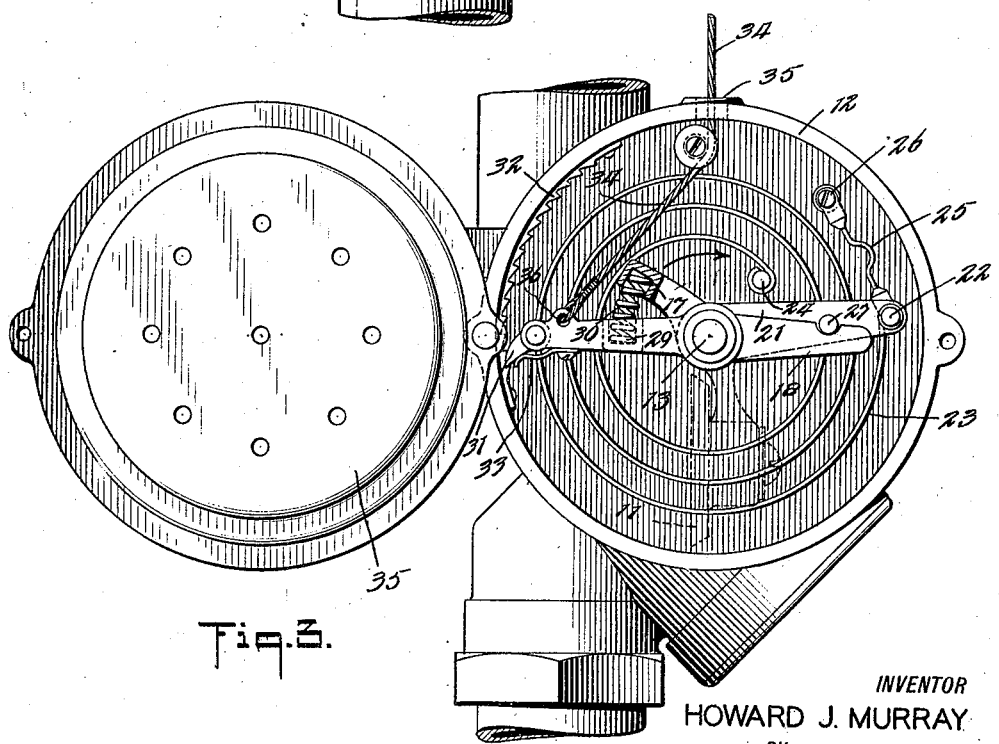
Fig. 3 is a view of the device shown in Fig. 1 on the reverse side thereof and with the mechanism containing casing open to display its contents.

Loosely mounted on the stem 13 in advance of the arm 18 is a manually actuated arm 28 provided intermediate its end with an upwardly facing spring seat 29. A short coiled spring 30 has one end located in the seat 17 and the other end located in the seat 29. It is understood that when the parts are in the normal position with the valve open as shown in Fig. 3, this spring is either not under any tension whatsoever, or is only slightly distorted from its normal distended position. It is the intent that the spring be available and in position to promptly advance the valve towards its seat when the arm 28 is rotated but the spring is not normally under any tension which would cause it to become weakened with age.

The free end of the arm 28 is provided with a pawl 31 pivoted thereto and which engages the teeth of a one-way ratchet 32. The pawl is resiliently held in position so as to engage with the rack teeth by means of a pawl spring 33. The inclination of the teeth is so arranged that the arm 28 is free to move clockwise and in position to close the valve, but is restrained from retreating anti-clockwise under tension of the spring 30. A flexible pull member 34 is intruded through an opening 35 in the side of the casing and is secured to the arm 28 by being passed through an eye 36 formed in the arm adjacent the pawl.

From this construction it is appreciated that a pull on the member 34 will cause arm 28 to act through spring 30 and arm 16 to move the valve into engagement with its seat during which time the pawl rides idly and upwardly along the rack teeth. The teeth are so disposed that the pawl can be advanced with the arm 28 beyond the position where the valve is in engagement with its seat. A continued advance of the arm beyond this point acts on the spring to place it under tension and the tensioned spring reacts on the valve to maintain the same firmly in engagement with its seat.

It is appreciated that the valve will be so held even tho tension be removed by the operator from the pull member 34. The spring cannot be released as the pawl is holding the same in its compressed position between the arm 30 and the arm 16 secured to the valve. The valve is thus moved automatically into a locked position incidental to the closing of the same and remains not only locked but locked under spring tension until it is positively released.

Should it be desired to open the valve the casing 12 is opened by swinging its cover 35 into the open position as shown in Fig. 3; the pawl is moved into unlatched position against the resistance of spring 33 and the valve opened by swinging the arm 28 into valve open position as shown in Fig. 3, the pawl is then released to engage the first tooth and the parts are again in position for either manual or automatic closing of the valve as shown in Fig. 3.

By means of a device of the type disclosed it is possible to retain all of the advantages inherent in self-closing valves which are normally held in open position by means of a fusible link and at the same time there is attained a structure which can be actuated manually and repeatedly without interfering with the fuse held spring and associated valve closing mechanism.

It is of course possible to place any desired tension on the spring which holds the valve in closed position following the manual closing of the valve. In the normal operation the valve is usually jerked into closed position and it is readily appreciated that the more powerful the jerk the greater will be the tension imposed on the spring and the more secure will be the holding of the valve onto its seat. The device disclosed has the peculiar advantage in that the valve seating, manually-actuated spring is not normally under tension and is only placed under tension when it is required to function. In this way it is assured that the spring will be capable of functioning when required and will not have lost its life or temper during prolonged periods in which it would normally be held under tension as is the case in the present forms of similar valves.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a gas cut-off, the combination of a valve provided with a stem, a casting for containing the valve controlling mechanism and into which the stem is intruded, said mechanism including a member secured to the stem and comprising a valve arm provided with a spring seat on one side of the stem and with a valve arm provided with a pin seat on the other side, an automatically actuated arm loose on the stem and provided with a laterally projecting pin engaging said pin seat, a spring engaging the automatically actuated arm and tending to force the pin towards the second mentioned valve arm to close the valve, a fuse link engaging the automatically actuated arm to hold the same against the tension of the spring, a manually actuated arm loose on the stem and provided with a spring seat, a spring having opposite ends engaging in said seats and acting, when the valve is closed manually, to force the valve firmly onto its seat, a one-way pawl and rack connection between the casing and the manually actuated arm and a manually actuated pull member intruded into the casing and engaging the manually actuated arm to move the valve into closed position and in the direction permitted by the pawl and rack connections.

2. In a valve construction, the combination of a normally open valve provided with a valve stem, an arm secured to the valve stem, an actuating arm loose on the valve stem, a pull member engaging the actuating arm to close the valve and a spring between said arms, said spring being normally not under any material tension but acting when the actuating arm is advanced by means of the pull member to bear on the arm secured to the stem to advance the valve to its seat and acting on the further advance of the actuating arm to force the valve tightly onto its seat.

3. In a valve construction, the combination of a normally open valve provided with a valve stem, an arm secured to the valve stem, an actuating arm loose on the valve stem, a pull member engaging the actuating arm to close the valve and a spring between said arms, said spring being normally not under any material tension but acting when the actuating arm is advanced by means of the pull member to bear on the arm secured to the stem to advance the valve to its seat and acting on the further advance of the actuating arm to force the valve tightly onto its seat, and means for preventing the retreat of the actuating arm under the force of said spring thereby to secure the valve firmly onto its seat by the tension of said spring.

4. In a valve construction, the combination of a valve, a manually actuated arm, a compression spring normally not under tension and disposed between the arm and value, a pull member engaging the arm and adapted to cause the arm to bear on the spring and to act through the latter to force the valve towards its seat and said spring acting to hold the valve to its seat.

5. In a valve construction, the combination of a normally open valve, means responsive to a raise in temperature for automatically closing the valve, manually actuated means independent of said automatically closing means for moving the valve into closing position, said last name means including a spring for forcing the valve into engagement with its seat.

6. In a valve construction, the combination of a normally open valve provided with an operating member, two sets of mechanisms virtually independent of each other and both adapted to act on the operating member to close the valve, each of said mechanisms including a spring for forcing the valve onto its seat.

7. In a valve construction, the combination of a normally open valve, manually actuated mechanism for closing the valve, said mechanism including an arm mounted for oscillating movement, means for permitting the movement of the arm in the direction for closing the valve and adapted to prevent movement in the reverse direction and a pull member for turning the arm in its permissible direction to close the valve.

8. In a valve construction, a valve provided with an actuating arm mounted for oscillating movement, a spring normally not under tension and adapted to be placed under tension for bearing on said arm and acting therethrough with a leverage effect for holding the valve onto its seat, and manually actuated means for energizing said spring and actuating said arm to move the valve towards its seat and causing the spring to secure the valve to its seat under tension of the spring.

9. In a device of the class described, the combination of a support, a valve, an arm adapted to engage said valve, a spring engaging said arm and tending to move the arm and seat the valve, a fusible link having one end secured to the support and the other end secured to the arm to resist the valve closing movement of said arm, and manually actuated means for causing said valve to move into locked engagement with its seat.

10. In a device of the class described, the combination of a normally open valve, a spring tending to close the valve on to its seat, means under tension of said spring and including a fusible link acting to hold the valve in open position off its seat, locking means adapted to secure the valve firmly in engagement with its seat, and a manually actuated control for said locking means and for moving said valve on to its seat.

Signed at New York city, in the county of New York and State of New York this fifth day of November, A. D. 1926.

HOWARD J. MURRAY.